US012037833B2

(12) United States Patent
Shibayama et al.

(10) Patent No.: US 12,037,833 B2
(45) Date of Patent: Jul. 16, 2024

(54) SLIDE DOOR DRIVING DEVICE

(71) Applicants: AISIN CORPORATION, Kariya (JP); TOYOTA JIDOSHA KABUSHIKI KAISHA, Toyota (JP); TOYOTA SHATAI KABUSHIKI KAISHA, Kariya (JP)

(72) Inventors: Satoshi Shibayama, Kariya (JP); Masato Mori, Kariya (JP); Shunsuke Kanagai, Anjo (JP); Hideaki Kanasugi, Miyoshi (JP); Nobuo Hayama, Kariya (JP); Yusuke Kato, Kariya (JP); Nobuaki Sakai, Kariya (JP)

(73) Assignees: AISIN CORPORATION, Kariya (JP); TOYOTA JIDOSHA KABUSHIKI KAISHA, Toyota (JP); TOYOTA SHATAI KABUSHIKI KAISHA, Kariya (JP)

( * ) Notice: Subject to any disclaimer, the term of this patent is extended or adjusted under 35 U.S.C. 154(b) by 0 days.

(21) Appl. No.: 17/657,503

(22) Filed: Mar. 31, 2022

(65) Prior Publication Data

US 2022/0316256 A1 Oct. 6, 2022

(30) Foreign Application Priority Data

Apr. 2, 2021 (JP) ................................ 2021-063613

(51) Int. Cl.
*E05F 15/646* (2015.01)
*E05D 15/10* (2006.01)

(52) U.S. Cl.
CPC ........ *E05F 15/646* (2015.01); *E05D 15/1042* (2013.01); *E05D 2015/1055* (2013.01);
(Continued)

(58) Field of Classification Search
CPC .................. E05F 15/646; E05F 15/643; E05D 2015/1055; E05D 15/1044; E05D 15/1047
See application file for complete search history.

(56) References Cited

U.S. PATENT DOCUMENTS 4,573,286 A * 3/1986 Favrel ................ E05D 15/0643 16/104
5,168,666 A * 12/1992 Koura .................. E05F 15/646 49/360
(Continued)

FOREIGN PATENT DOCUMENTS

CN 205858030 U 1/2017
CN 109930939 A 6/2019
(Continued)

OTHER PUBLICATIONS

Chinese Office Action issued in Chiness Patent Application No. 202210330397.5 on Sep. 13, 2023.
(Continued)

*Primary Examiner* — Catherine A Kelly
*Assistant Examiner* — Patrick B. Ponciano
(74) *Attorney, Agent, or Firm* — Oblon, McClelland, Maier & Neustadt, L.L.P.

(57) ABSTRACT

A slide door driving device includes a support plate that is an elongated plate member, two driven pulleys supported respectively by opposite ends of the support plate in a longitudinal direction of the support plate; a belt wound around the two driven pulleys; a connector by which the belt is connected to the slide door; and a driving portion supported by the support plate and configured to drive the belt.

11 Claims, 11 Drawing Sheets

(52) U.S. Cl.
CPC ... *E05Y 2201/652* (2013.01); *E05Y 2201/668* (2013.01); *E05Y 2900/531* (2013.01)

(56) References Cited

U.S. PATENT DOCUMENTS

| | | | | |
|---|---|---|---|---|
| 5,551,190 | A * | 9/1996 | Yamagishi | E05F 15/646 49/360 |
| 6,189,265 | B1 * | 2/2001 | Fink | E05F 15/652 49/118 |
| 6,866,250 | B2 * | 3/2005 | Kita | E05F 15/646 254/225 |
| 7,032,349 | B2 * | 4/2006 | Oberheide | E05F 15/646 49/360 |
| 7,347,025 | B2 * | 3/2008 | Fukumoto | B60J 5/06 49/360 |
| 7,585,014 | B2 * | 9/2009 | Nishimura | B60J 5/06 49/262 |
| 7,934,737 | B2 * | 5/2011 | Okada | B60R 3/02 280/166 |
| 7,997,639 | B2 * | 8/2011 | Yokomori | E05F 15/646 296/146.4 |
| 8,225,552 | B2 * | 7/2012 | Yokomori | E05F 15/646 49/360 |
| 8,622,408 | B2 * | 1/2014 | Ishida | B60J 5/06 280/163 |
| 9,670,708 | B2 * | 6/2017 | Tsubaki | E05F 15/646 |
| 9,803,407 | B2 * | 10/2017 | Seto | E05F 15/646 |
| 9,932,763 | B2 * | 4/2018 | Seto | E05F 15/643 |
| 2001/0013200 | A1 * | 8/2001 | Fink | E05F 15/565 49/118 |
| 2012/0261894 | A1 * | 10/2012 | Ishida | E05F 15/646 280/166 |
| 2016/0126812 | A1 | 5/2016 | Matsumoto et al. | |
| 2016/0333626 | A1 | 11/2016 | Seto et al. | |
| 2022/0363113 | A1 * | 11/2022 | Kiryu | B60J 5/06 |

FOREIGN PATENT DOCUMENTS

| | | | |
|---|---|---|---|
| JP | 11-200708 | A | 7/1999 |
| JP | 2013-220795 | A | 10/2013 |
| JP | 2015-17651 | A | 1/2015 |
| JP | 2019-100081 | A | 6/2019 |

OTHER PUBLICATIONS

Japanese Office Action issued Aug. 29, 2023 in Japanese Application 2021-063613, 3 pages.

* cited by examiner

SLIDE DOOR DRIVING DEVICE

CROSS-REFERENCE TO RELATED APPLICATION

This application claims priority to Japanese Patent Application No. 2021-063613 filed on Apr. 2, 2021, incorporated herein by reference in its entirety.

BACKGROUND

1. Technical Field

The disclosure relates to a slide door driving device.

2. Description of Related Art

Japanese Unexamined Patent Application Publication No. 2019-100081 (JP 2019-100081 A) describes a door opening-closing device as a slide door driving device for opening and closing a slide door of a vehicle. The door opening-closing device includes a belt module extending along a guide rail, two timing pulleys provided respectively in a front end and a rear end of the belt module, a belt wound around the two timing pulleys, and a motor configured to drive the belt. The belt module is formed with the use of a resin material.

SUMMARY

It is assumed that a case where the slide door driving device described above is applied to a plurality of vehicle types. In this case, a belt module having one shape may not be applied to all the vehicle types. In this case, it is necessary to prepare individual metal molds for forming necessary belt modules having different shapes. That is, it is likely to be difficult to apply the door opening-closing device described above to a plurality of vehicle types having different specifications.

One aspect of the disclosure relates to a slide door driving device configured to drive a slide door, the slide door driving device being installed above a door opening of a vehicle body, the slide door being configured to open and close the door opening. The slide door driving device includes a support plate, two driven pulleys, a belt, a connector, and a driving portion. The support plate is an elongated plate member. The two driven pulleys are supported respectively by opposite ends of the support plate in a longitudinal direction of the support plate. The belt is wound around the two driven pulleys. The belt is connected to the slide door by the connector. The driving portion is supported by the support plate and configured to drive the belt.

The slide door driving device having the above-mentioned configuration is configured by attaching the driven pulleys and the driving portion to the support plate that is an elongated plate member. Accordingly, due to the structure of the support plate, it is possible to easily change the length of the support plate and it is possible to easily change the positions of the driven pulleys, for example. Accordingly, it is possible to easily apply the slide door driving device to a plurality of vehicle types having different specifications.

The slide door driving device according to the above-mentioned aspect may further include a fixing plate extending from the support plate in a direction intersecting with the support plate, the fixing plate being fixed to the vehicle body. In a state where the fixing plate is fixed to the vehicle body, the fixing plate may be disposed inwardly in a vehicle width direction from the driving portion. The fixing plate may have a fixing hole extending through the fixing plate in the vehicle width direction.

In the slide door driving device having the above-mentioned configuration, the fixing plate has a fixing hole extending through the fixing plate in the vehicle width direction. Accordingly, the fastening direction in which the fixing plate is fastened to the vehicle body is the vehicle width direction. Accordingly, in comparison with a case where the fastening direction in which the fixing plate is fastened to the vehicle body is the up-down direction, a target to which the fixing plate is fixed does not need to project inwardly in the vehicle width direction. As a result, with the slide door driving device, it is possible to provide a wide vehicle cabin.

In the slide door driving device according to the above-mentioned aspect, the fixing plate may be formed by bending a metal plate configured to be fastened to the support plate.

In the slide door driving device according to the above-mentioned aspect, the fixing plate may include a locking portion configured to be locked to the vehicle body. When an operator installs the slide door driving device having the above-mentioned configuration in the vehicle body, the operator can lock the fixing plate to a fixation target of the vehicle body. Accordingly, the operator can put part of the self-weight of the slide door driving device on the vehicle body. Thus, the slide door driving device enhances ease of work (i.e., enhances work efficiency).

In the slide door driving device according to the above-mentioned aspect, the locking portion may be formed by cutting and raising a part of the fixing plate.

The slide door driving device according to the above-mentioned aspect may further include a guide portion supported by the support plate and configured to guide the belt by making sliding contact with the belt that is driven. In the slide door driving device having the above-mentioned configuration, the guide portion is provided, and therefore, the belt can be driven stably.

The slide door driving device according to the above-mentioned aspect may further include a reinforcing frame extending in the longitudinal direction of the support plate, the reinforcing frame being configured to reinforce the support plate. In the slide door driving device having the above-mentioned configuration, the support plate is not likely to deform (i.e., the support plate hardly deforms) due to external force.

It is possible to easily apply the slide door driving device according to the above-mentioned aspect to a plurality of vehicle types having different specifications.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
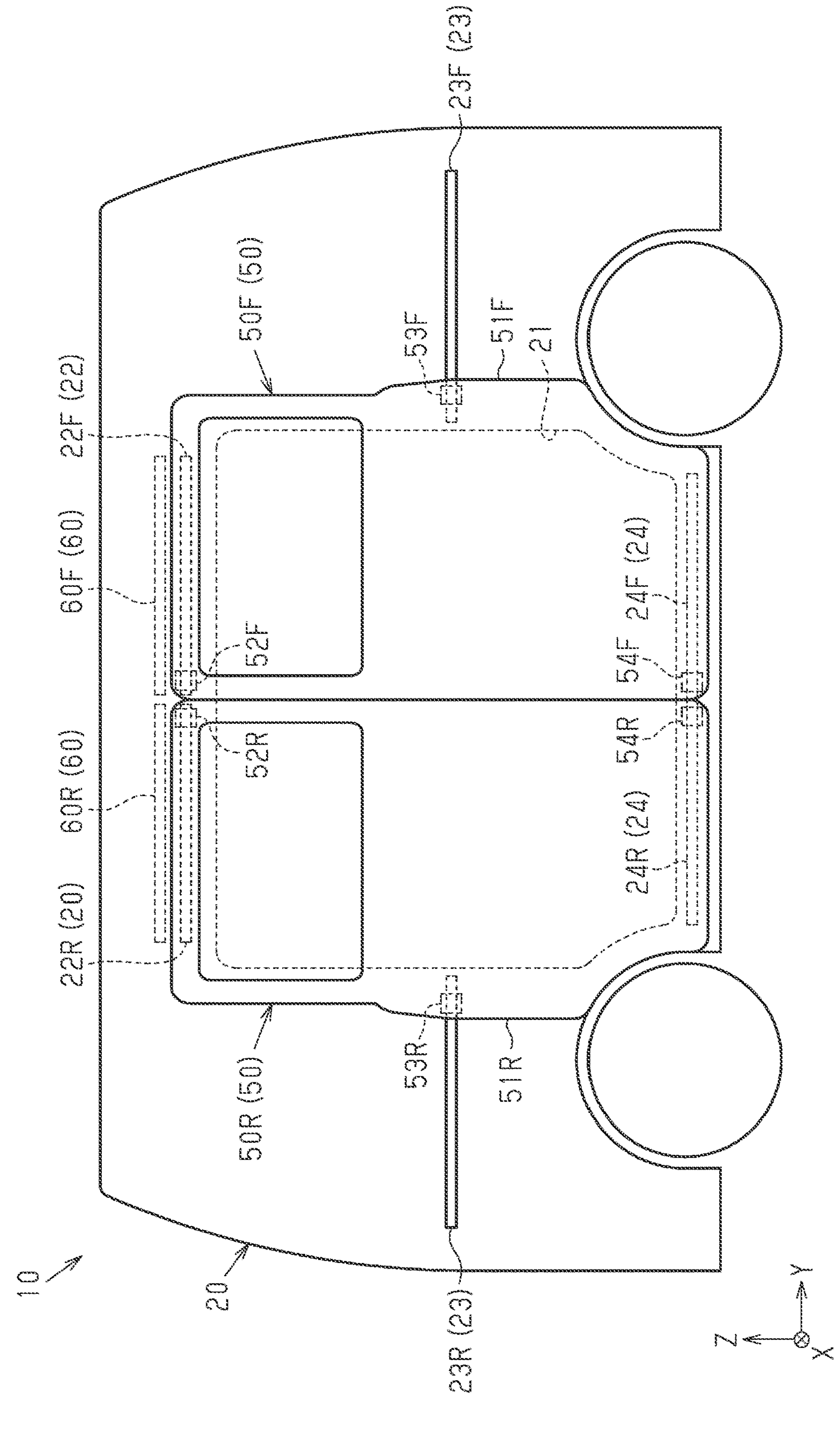
FIG. 1 is a schematic view of a vehicle including a slide door driving device according to one embodiment.

A vehicle including a slide door driving device (hereinafter also referred to as a "door driving device") according to one embodiment of the disclosure will be described. A vehicle 10 will be described. As illustrated in FIG. 1, the vehicle 10 includes a vehicle body 20, two slide doors 50 (50F, 50R), and two door driving devices 60 (60F, 60R). In the following description, the vehicle width direction is also referred to as the "width direction", the vehicle front-rear direction is also referred to as the "front-rear direction," and the vehicle up-down direction is also referred to as the "up-down direction." In the drawings, an X-axis is an axis extending in the width direction, a Y-axis is an axis extending in the front-rear direction, and a Z-axis is an axis extending in the up-down direction. Further, in the width direction, a direction toward the center of the vehicle 10 is also referred to as the "direction toward the inner side (direction extending inwardly)" in the width direction, and a direction opposite to the direction toward the inner side is also referred to as the "direction toward the outer side (direction extending outwardly)" in the width direction.

Figure 2:
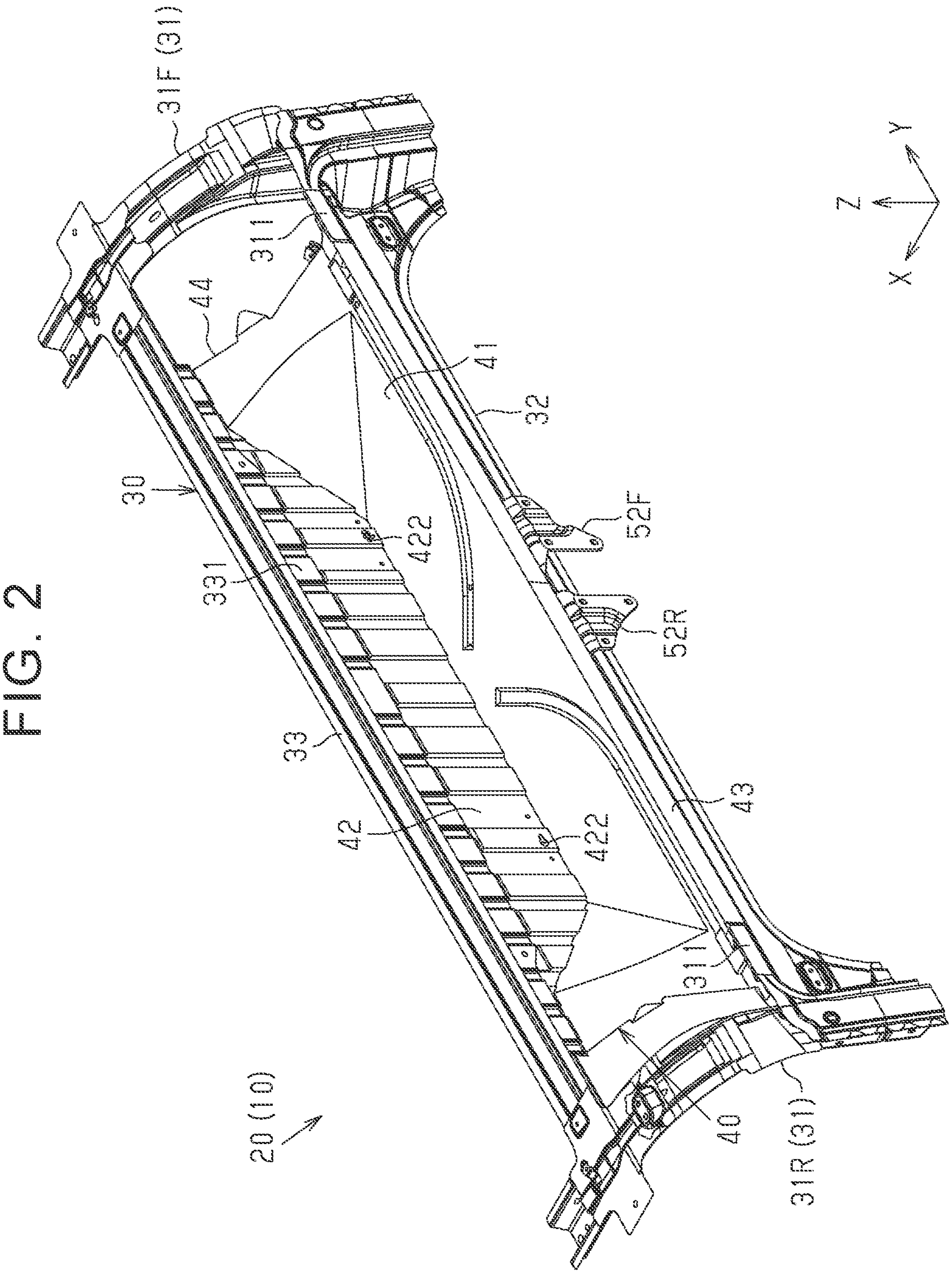
FIG. 2 is a perspective view of an upper part of a side portion of the vehicle.
Figure 3:
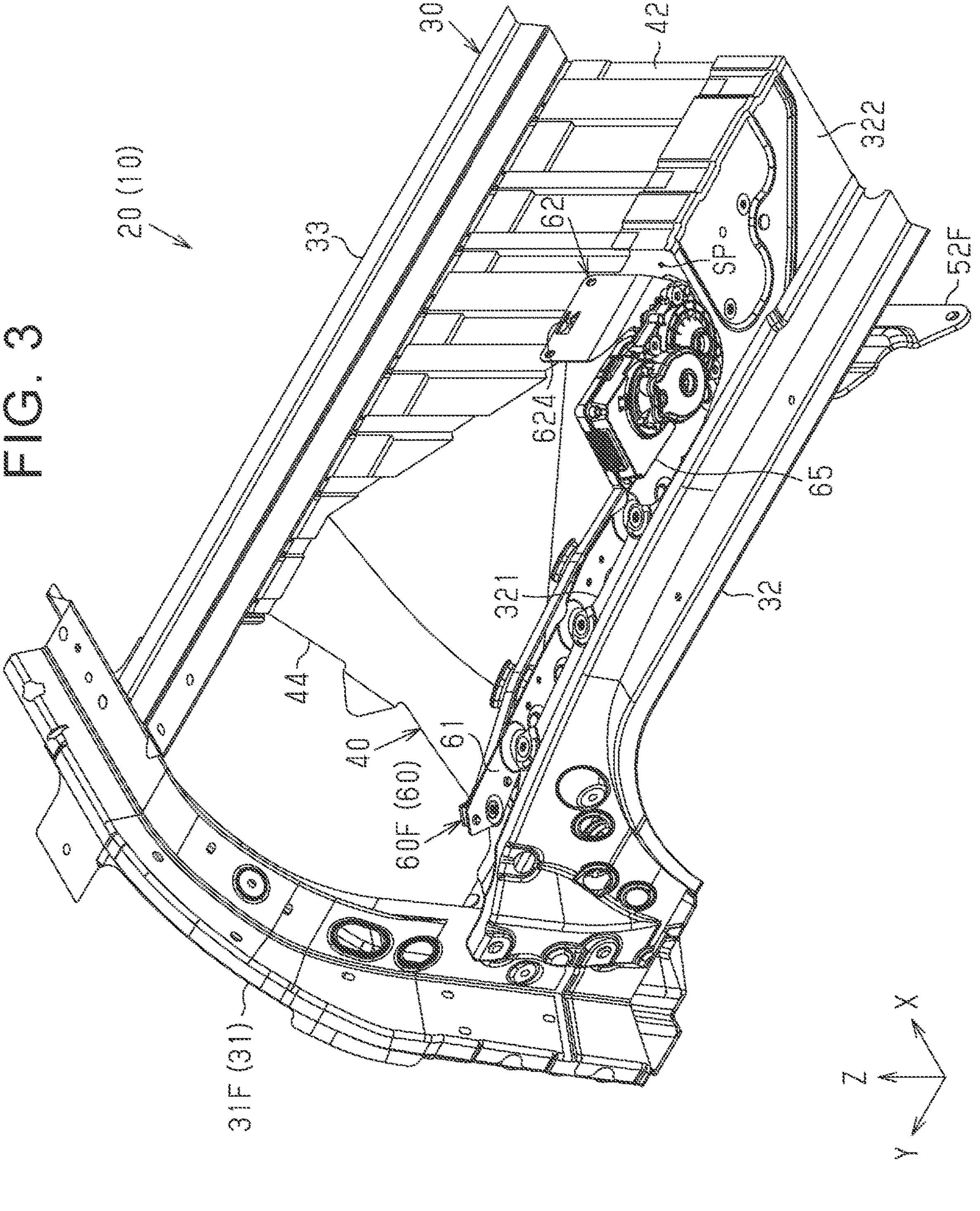
FIG. 3 is a perspective view of the upper part of the side portion of the vehicle.

Next, a vehicle body 20 will be described. As illustrated in FIG. 1, the vehicle body 20 includes a door opening 21, two upper rails 22 (22F, 22R), two center rails 23 (23F, 23R), and two lower rails 24 (24F, 24R). As illustrated in FIGS. 2, 3, the vehicle body 20 includes a frame 30 constituting a framework of the vehicle 10, and a reinforcing structure 40 reinforcing the frame 30.

As illustrated in FIG. 1, the door opening 21 is opened (i.e., provided) on a side face of the vehicle body 20. The door opening 21 has a rectangular shape. A longitudinal direction of the door opening 21 is the front-rear direction and a short direction of the door opening 21 is the up-down direction. The door opening 21 may be provided only on the right side face of the vehicle 10, or may be provided only on the left side face of the vehicle 10, or the door openings 21 may be respectively provided on both side faces of the vehicle 10.

The upper rail 22F, the center rail 23F, and the lower rail 24F are disposed forward of a central position of the door opening 21 in the front-rear direction. More specifically, the upper rail 22F is disposed above the door opening 21. The center rail 23F is disposed forward of the door opening 21. The lower rail 24F is disposed below the door opening 21. Further, the center rail 23F is disposed below the upper rail 22F and above the lower rail 24F. Each of the upper rail 22F, the center rail 23F, and the lower rail 24F linearly extends rearward and then curves inwardly in the width direction while extending rearward.

The upper rail 22R, the center rail 23R, and the lower rail 24R are disposed rearward of the central position of the door opening 21 in the front-rear direction. The upper rail 22R, the center rail 23R, and the lower rail 24R are symmetrical to the upper rail 22F, the center rail 23F, and the lower rail 24F, respectively, in the front-rear direction. Therefore, further descriptions about the upper rail 22R, the center rail 23R, and the lower rail 24R will be omitted. Further, similarly to these rails, descriptions about paired constituents in the front-rear direction will be omitted without any particular notice.

Next, the frame 30 will be described. As illustrated in FIGS. 2, 3, the frame 30 includes two first frames 31 (31F, 31R) disposed at an interval in the front-rear direction, and a second frame 32 and a third frame 33 by which the first frames 31F, 31R are connected in the front-rear direction, within the range illustrated herein. The first frames 31F, 31R, the second frame 32, and the third frame 33 constitute a framework extending from a side portion of the vehicle 10 to a roof of the vehicle 10.

Figure 4:
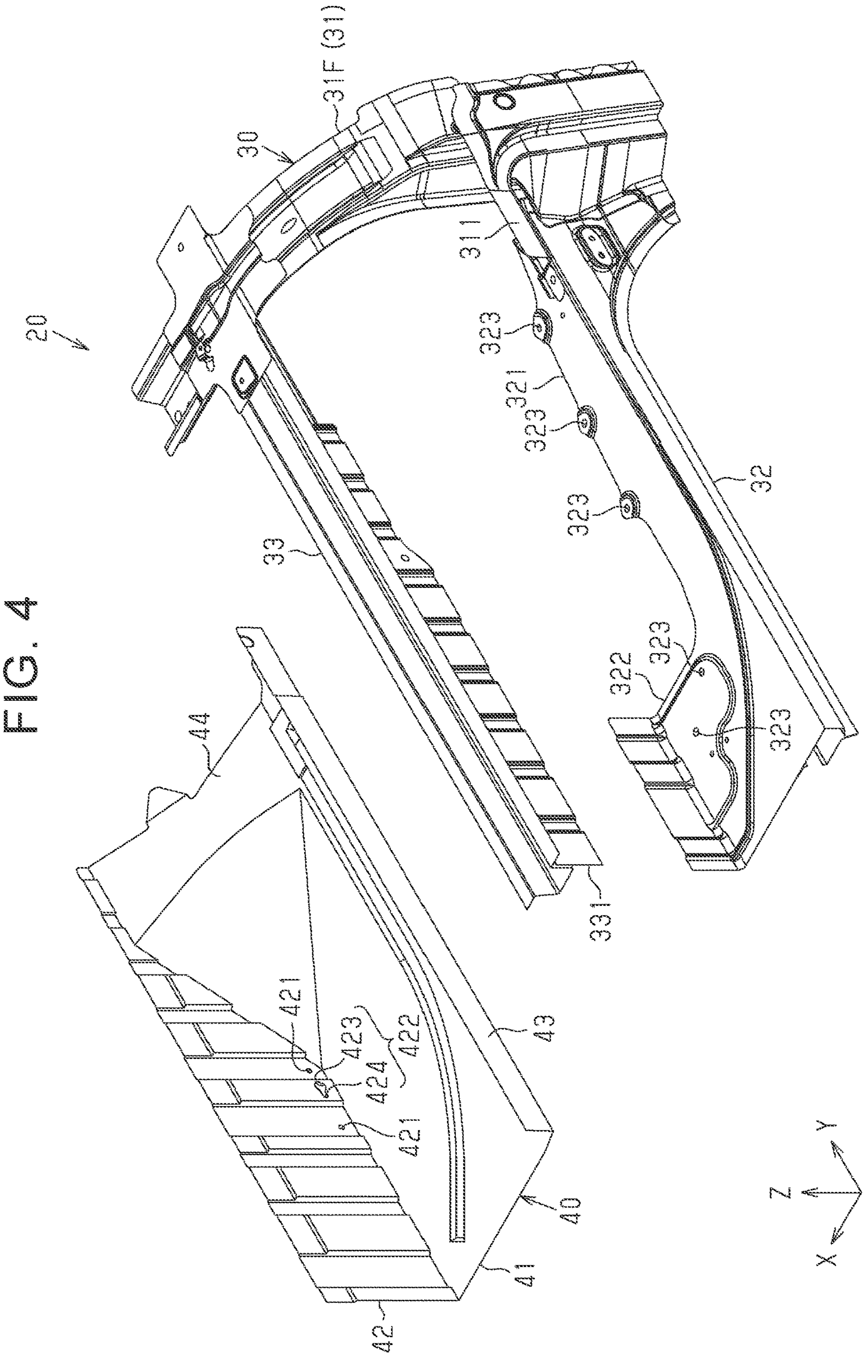
FIG. 4 is an exploded perspective view of an upper part of a side portion of a vehicle body.
Figure 5:
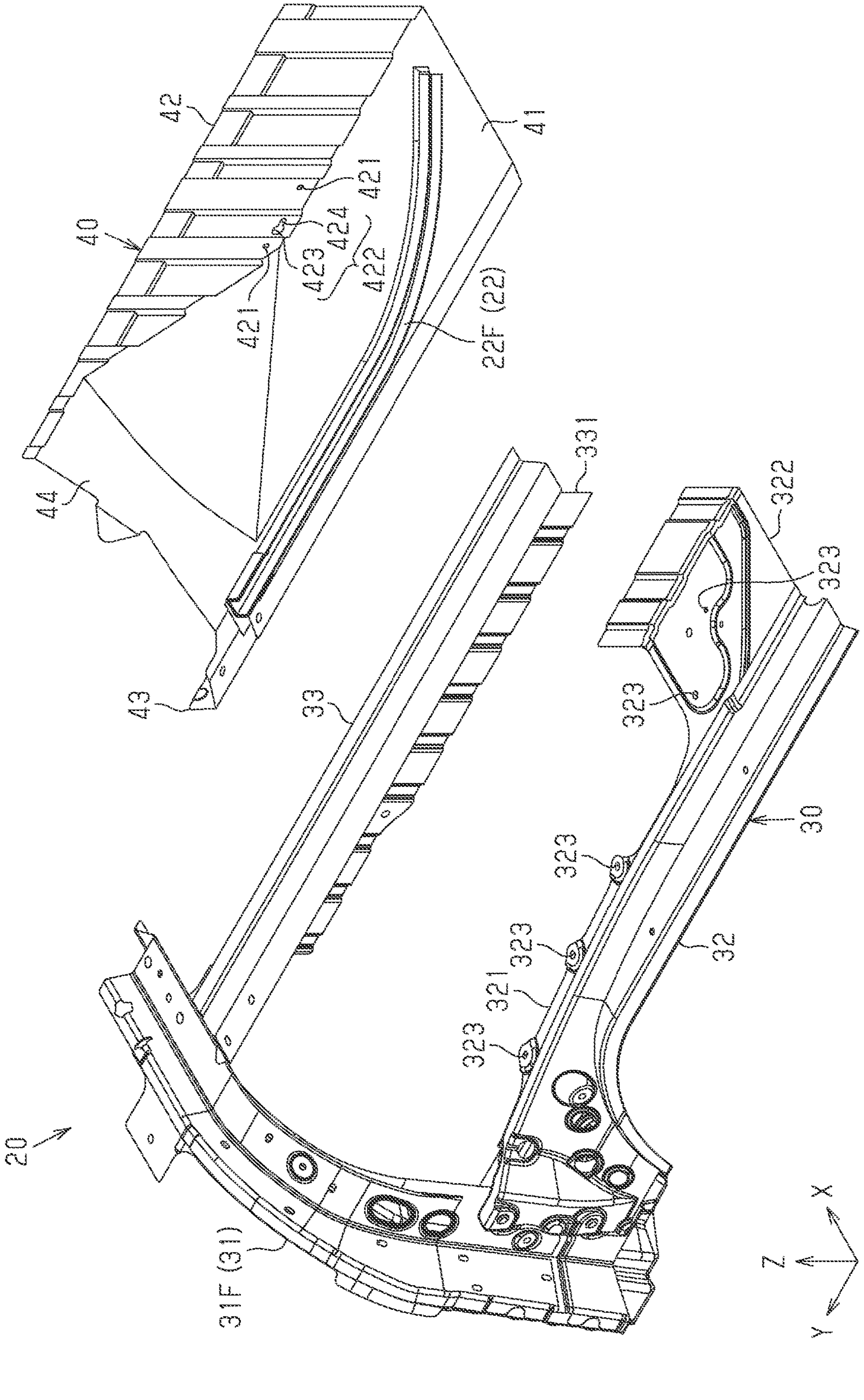
FIG. 5 is an exploded perspective view of the upper part of the side portion of the vehicle body.
Figure 6:
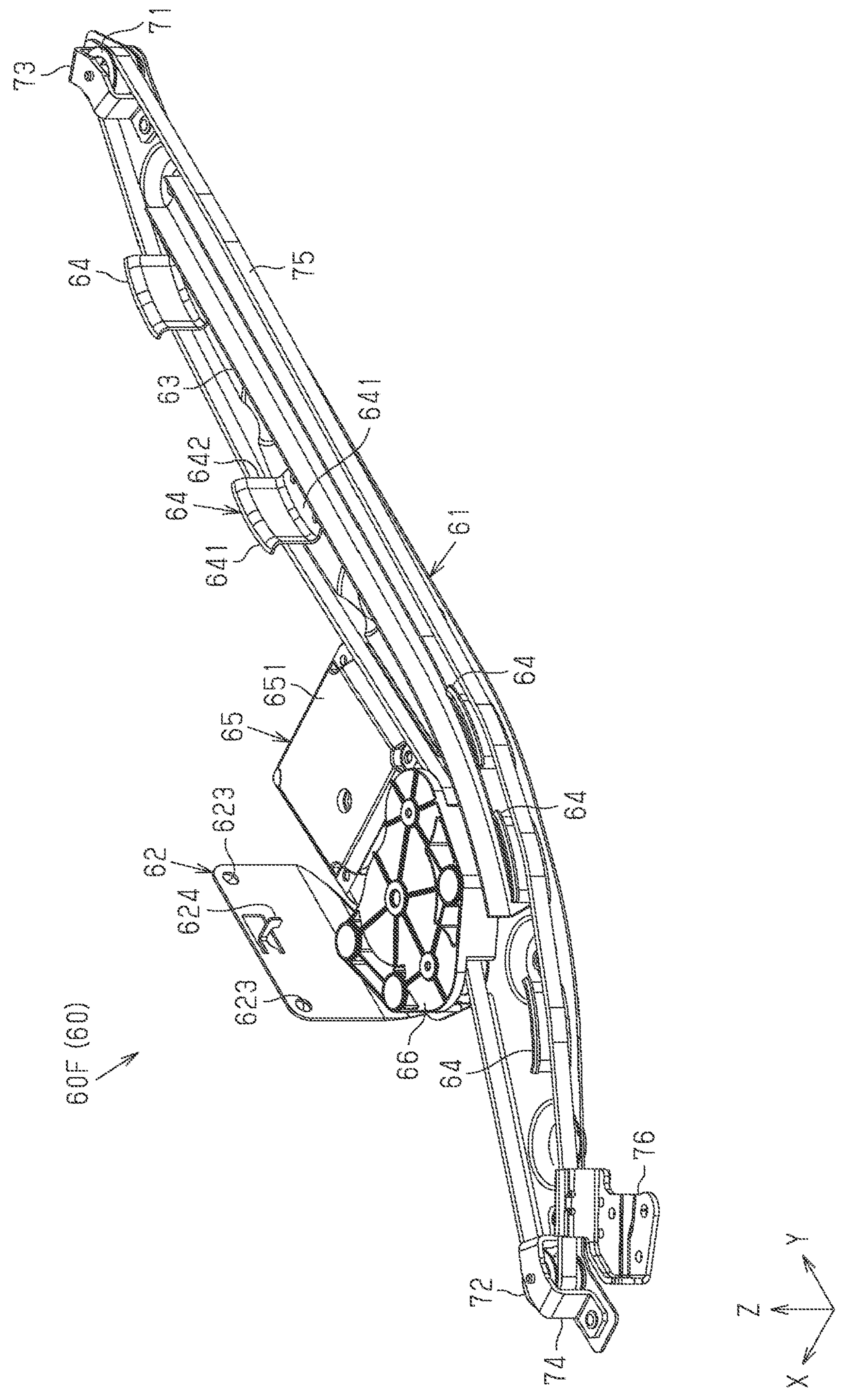
FIG. 6 is a perspective view of the slide door driving device.
Figure 7:
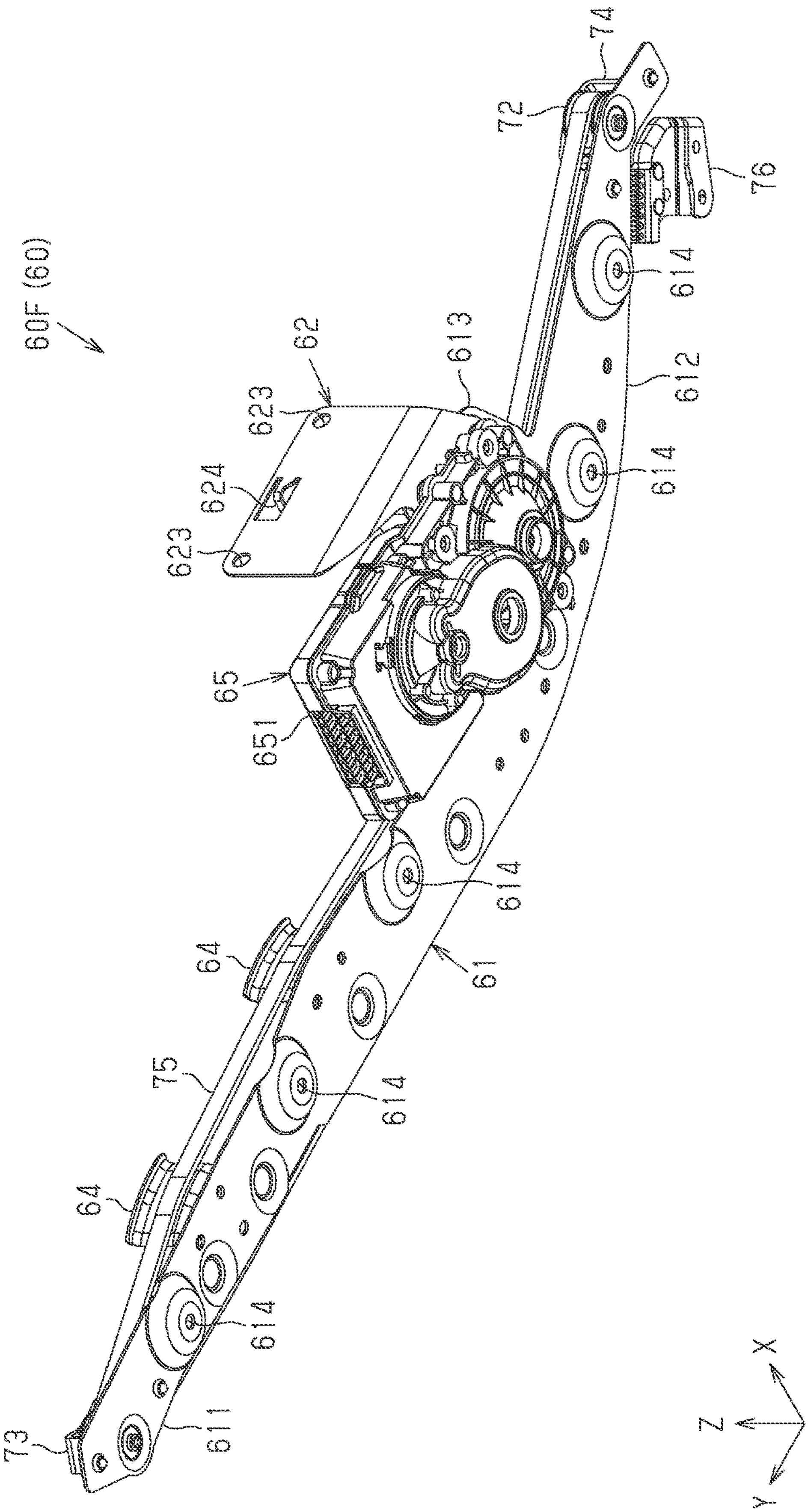
FIG. 7 is a perspective view of the slide door driving device.

As illustrated in FIGS. 4, 5, the first frame 31 curves inwardly in the width direction while extending upward. As illustrated in FIG. 2, the first frame 31F includes a first panel 311 extending rearward, and the first frame 31R includes a first panel 311 extending forward. That is, the first panel 311 of the first frame 31F and the first panel 311 of the first frame 31R extend in directions approaching each other.

As illustrated in FIGS. 4, 5, the second frame 32 is disposed outwardly in the width direction from the third frame 33 and below the third frame 33. The second frame 32 includes a second panel 321 extending inwardly in the width direction from each of the opposite ends of the second frame 32 in the front-rear direction, and a third panel 322 extending inwardly in the width direction from a central part of the second frame 32 in the front-rear direction. The second panel 321 has a length shorter than that of the third panel 322 in the width direction. The third panel 322 has a distal end bending upward. The second panel 321 and the third panel 322 have fixing holes 323 formed to extend through the second panel 321 and the third panel 322 in the up-down direction.

The third frame 33 includes a fourth panel 331 extending in the front-rear direction of the third frame 33 and extending downward. The fourth panel 331 is disposed outwardly in the width direction from the distal end of the third panel 322.

Next, the reinforcing structure 40 will be described. As illustrated in FIGS. 4, 5, the reinforcing structure 40 includes a bottom wall 41, an inner wall 42 extending upward from an inner end of the bottom wall 41 in the width direction, an outer wall 43 extending upward from an outer end of the bottom wall 41 in the width direction, and a side wall 44 by which respective end parts of the bottom wall 41 and the inner wall 42 in the front-rear direction are connected to each other.

As illustrated in FIG. 5, the bottom wall 41 has a trapezoidal shape in a bottom face view seen from the lower side. In other words, the bottom wall 41 is formed such that the length, in the front-rear direction, of an outer end of the bottom wall 41 is longer than that of an inner end thereof in the bottom face view seen from the lower side. The upper rail 22F is fixed to the bottom wall 41. The inner wall 42 has a trapezoidal shape in a side view seen in the width direction. In other words, the inner wall 42 is formed such that the length, in the front-rear direction, of an upper end of the inner wall 42 is longer than that of a lower end thereof in the side view seen in the width direction. The inner wall 42 is provided with recessed and projecting patterns formed repeatedly in the front-rear direction for the purpose of raising rigidity. The inner wall 42 has fixing holes 421 and a locking hole 422 formed at positions closer to the lower end in each end part of the inner wall 42 in the front-rear direction. The fixing holes 421 and the locking hole 422 extend through the inner wall 42 in the plate-thickness direction of the inner wall 42. The locking hole 422 includes a first locking hole 423 having a round shape and a second locking hole 424 having an elliptical shape in a side view seen in the width direction. The first locking hole 423 and the second locking hole 424 are connected to each other in the front-rear direction.

As illustrated in FIGS. 2, 3, the reinforcing structure 40 is connected to the frame 30. More specifically, the inner wall 42 of the reinforcing structure 40 is connected to the third panel 322 of the second frame 32. An upper end part of the inner wall 42 of the reinforcing structure 40 is connected to the fourth panel 331 of the third frame 33. The outer wall 43 of the reinforcing structure 40 is connected to the first panel 311 of the first frame 31. As illustrated in FIG. 3, when the reinforcing structure 40 is connected to the frame 30, a space is formed between the bottom wall 41 of the reinforcing structure 40 and the third panel 322 of the second frame 32. The space between the bottom wall 41 of the reinforcing structure 40 and the third panel 322 of the second frame 32 is an accommodation space SP in which the door driving device 60 is accommodated.

Note that the frame 30 and the reinforcing structure 40 are covered with an interior member (not illustrated). Therefore, the frame 30 and the reinforcing structure 40 are not exposed to a vehicle cabin. Next, the slide doors 50 will be described. As illustrated in FIG. 1, the slide door 50F includes a door main body 51F having a size corresponding to a front half of the door opening 21, and an upper hinge unit 52F, a center hinge unit 53F, and a lower hinge unit 54F that are fixed to the door main body 51F.

The upper hinge unit 52F and the lower hinge unit 54F are fixed in the vicinity of a rear end of the door main body 51F, and the center hinge unit 53F is fixed in the vicinity of a front end of the door main body 51F. The upper hinge unit 52F is fixed to an upper end part of the door main body 51F, and the lower hinge unit 54F is fixed to a lower end part of the door main body 51F. The center hinge unit 53F is fixed to a central part of the door main body 51F in the up-down direction. The upper hinge unit 52F engages with the upper rail 22F so as to be movable along the upper rail 22F. The center hinge unit 53F engages with the center rail 23F so as to be movable along the center rail 23F. The lower hinge unit 54F engages with the lower rail 24F so as to be movable along the lower rail 24F.

When the upper hinge unit 52F, the center hinge unit 53F, and the lower hinge unit 54F move relative to the upper rail 22F, the center rail 23F, and the lower rail 24F, respectively, the slide door 50F opens and closes the front half of the door opening 21. In the present embodiment, when the slide door 50F moves forward, an opening operation is performed, and when the slide door 50F moves rearward, a closing operation is performed. That is, an opening direction of the slide door 50F is a direction toward the front side, and a closing direction of the slide door 50F is a direction toward the rear side.

As illustrated in FIG. 1, the slide door 50R includes a door main body 51R having a size corresponding to a rear half of the door opening 21, and an upper hinge unit 52R, a center hinge unit 53R, and a lower hinge unit 54R that are fixed to the door main body MR. The slide door 50R is symmetrical to the slide door 50F in the front-rear direction. Therefore, further descriptions about the slide door 50R are omitted.

Next, the door driving device 60 will be described. As illustrated in FIGS. 6 to 9, the door driving device 60 includes a support plate 61, a bending plate 62, a reinforcing frame 63, a plurality of guide portions 64, a driving portion 65, a cover 66, a drive pulley 67, two pressing pulleys 68, 69, two driven pulleys 71, 72, two pulley support portions 73, 74, a belt 75, and a connector 76.

The support plate 61 is an elongated plate member. The length of the support plate 61 in its longitudinal direction is equivalent to the length of the upper rail 22 in the longitudinal direction. The support plate 61 is formed by press working (i.e., by stamping) on a metal plate such as an iron plate, for example. In the following description, a surface of the support plate 61 that faces upward when the door driving device 60 is installed in the vehicle 10 is also referred to as a "front surface," and a surface of the support plate 61 that faces downward when the door driving device 60 is installed in the vehicle 10 is also referred to as a "back surface."

Figure 8:
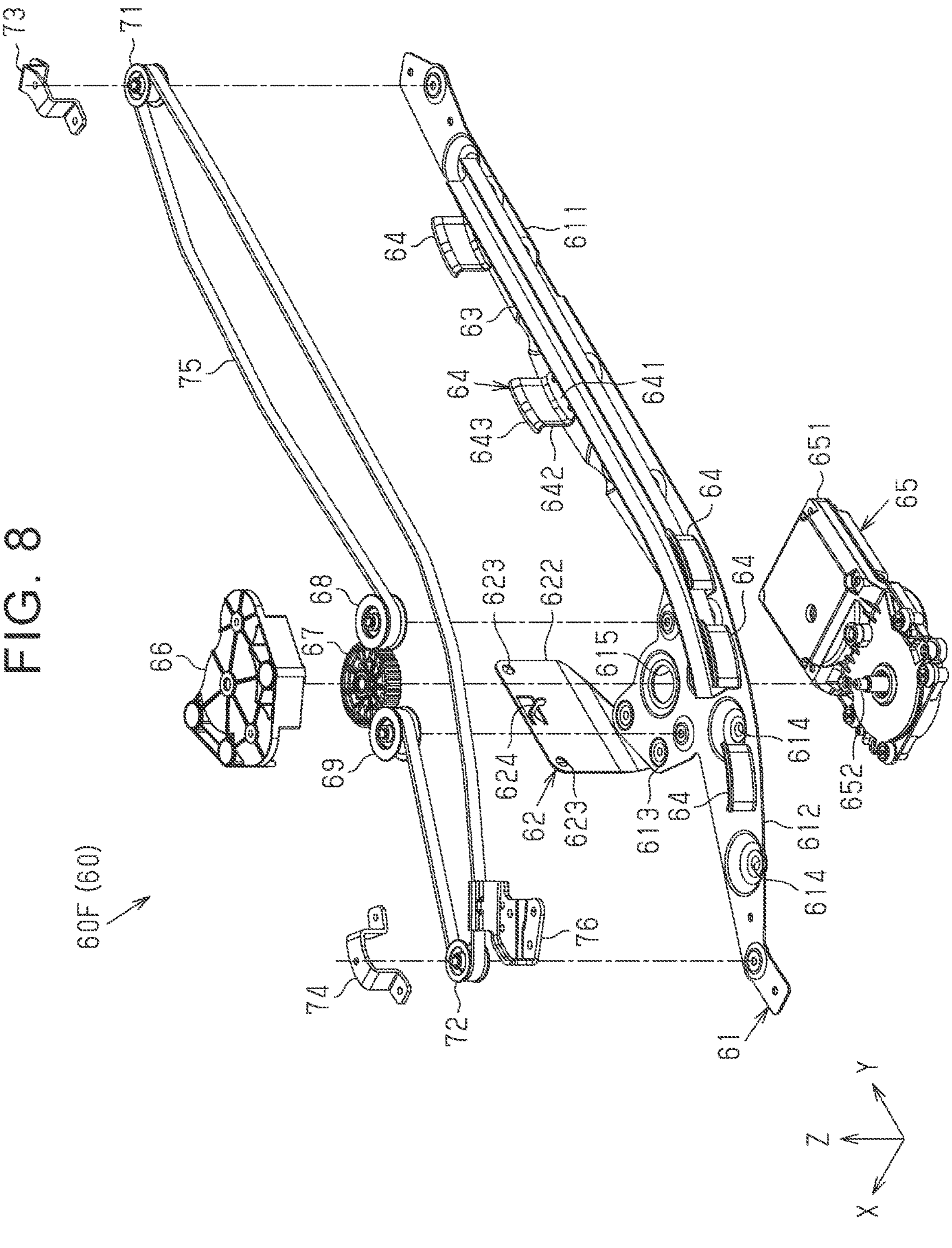
FIG. 8 is an exploded perspective view of the slide door driving device.
Figure 9:
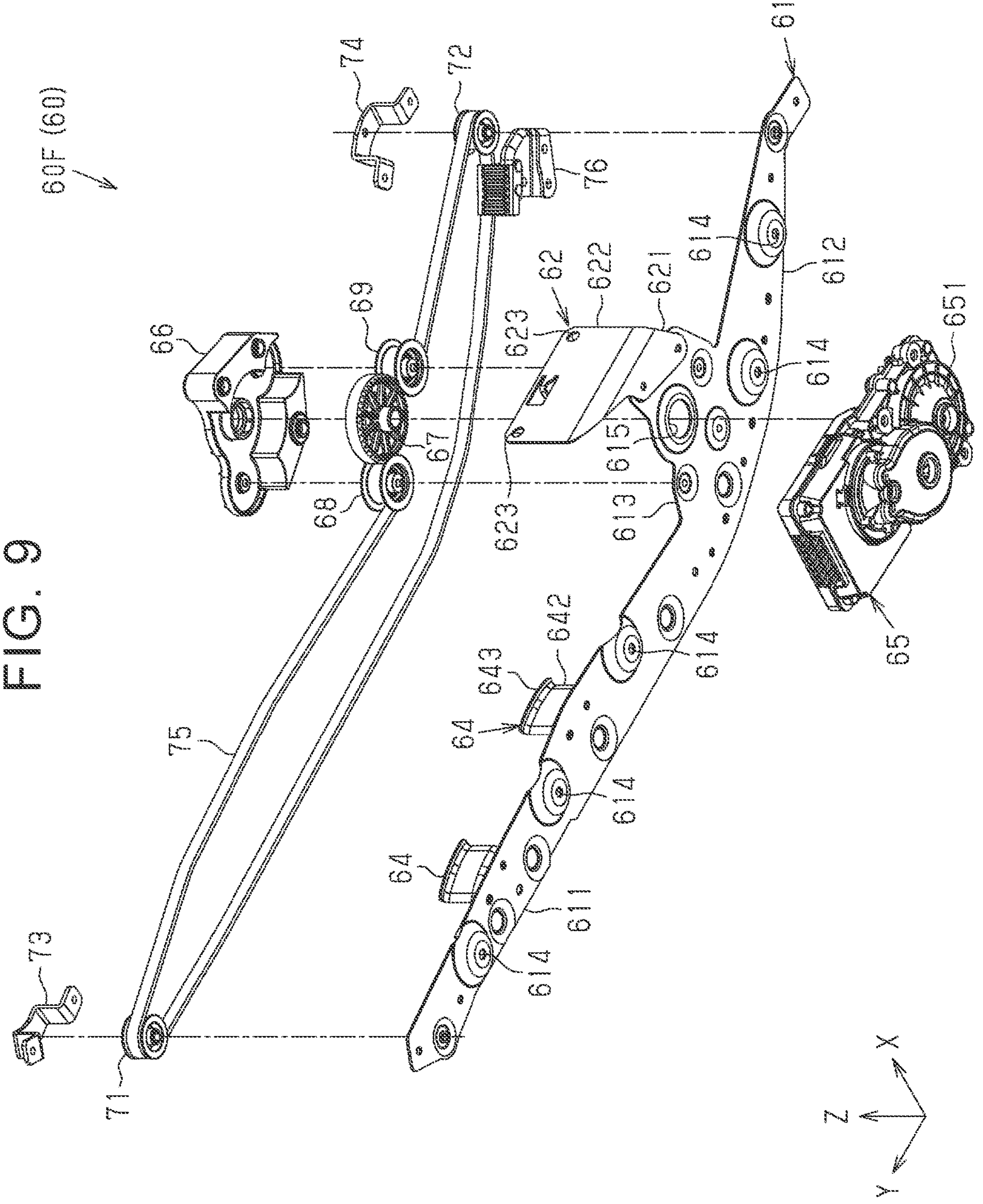
FIG. 9 is an exploded perspective view of the slide door driving device.

As illustrated in FIGS. 8, 9, in a state where the door driving device 60 is installed in the vehicle 10, the support plate 61 includes a first part 611 extending in the front-rear direction, a second part 612 extending inwardly in the width direction while extending forward from a front end of the first part 611, and a third part 613 extending inwardly in the width direction from a connecting part between the first part 611 and the second part 612. As illustrated in FIG. 9, the first part 611 and the second part 612 have a plurality of fixing holes 614 extending through the support plate 61 in its plate-thickness direction. The fixing holes 614 are used at the time when the door driving device 60 is fixed to the vehicle body 20. A part around each of the fixing holes 614 is recessed from the front surface toward the back surface. The third part 613 has an insertion hole 615 extending through the support plate 61 in the plate-thickness direction.

As illustrated in FIG. 9, the bending plate 62 includes a first bending plate 621 and a second bending plate 622 extending while bending from the first bending plate 621. The bending plate 62 is formed by bending a metal plate, for example. More specifically, the second bending plate 622 is formed by bending a metal plate configured to be fastened to the support plate 61, for example. The first bending plate 621 is fixed to the third part 613 of the support plate 61 by fastening members such as screw threads or bolts. In a state where the first bending plate 621 is fixed to the support plate 61, the second bending plate 622 extends from the support plate 61 such that a plane formed by the second bending plate 622 intersects with the support plate 61. In this respect, the second bending plate 622 corresponds to one example of a "fixing plate." The second bending plate 622 has a rectangular shape in a front view. As illustrated in FIGS. 8, 9, the second bending plate 622 includes a plurality of fixing holes 623 extending through the second bending plate 622 in its plate-thickness direction and a locking portion 624 extending in the plate-thickness direction. The fixing holes 623 are used at the time when the door driving device 60 is fixed to the vehicle body 20. The locking portion 624 extends in the plate-thickness direction of the second bending plate 622 and extends toward the first bending plate 621. That is, the locking portion 624 has a hook shape. The locking portion 624 may be formed by cutting and raising a part of the second bending plate 622, for example. In the present embodiment, the bending plate 62 is formed separately from the support plate 61. However, in an alternative embodiment, the bending plate 62 may be formed integrally with the support plate 61.

As illustrated in FIG. 8, the reinforcing frame 63 has an elongated shape. The reinforcing frame 63 has a U-shaped sectional shape perpendicular to its longitudinal direction. The length of the reinforcing frame 63 in the longitudinal direction is shorter than the length of the support plate 61 in the longitudinal direction. The reinforcing frame 63 may have a large second moment of area (i.e., a large moment of inertia of area) and may be lightweight. The reinforcing frame 63 is fixed to the support plate 61 in a state where the longitudinal direction of the reinforcing frame 63 coincides with the longitudinal direction of the support plate 61.

As illustrated in FIG. 8, the guide portion 64 includes a fixed wall 641 fixed to the support plate 61, a guide wall 642 extending while bending from the fixed wall 641, and a pressing wall 643 extending while bending from the guide wall 642. The guide portion 64 is formed by press working (i.e., by stamping) on a metal plate, for example. The fixed wall 641 and the pressing wall 643 extend from the guide wall 642 in the plate-thickness direction of the guide wall 642. Note that, when the guide wall 642 is taken as a reference, the extending direction of the fixed wall 641 (i.e., the direction in which the fixed wall 641 extends) is opposite to the extending direction of the pressing wall 643 (i.e., the direction in which the pressing wall 643 extends). The guide portions 64 are fixed to the support plate 61 by fastening members such as bolts or rivets. In a plan view of the door driving device 60, the guide portions 64 are disposed along outer edges of the first part 611 and the second part 612 of the support plate 61. The guide portions 64 may be formed by a material that is not likely to be worn (i.e., that is hardly worn) due to sliding of the belt 75 on the guide portions 64 (i.e., due to sliding contact with the belt 75).

As illustrated in FIGS. 8, 9, the driving portion 65 includes a case 651 in which component parts of the driving portion 65 are accommodated, and an output shaft 652 connected to the drive pulley 67. Although not illustrated herein, the driving portion 65 includes a motor and a transmission mechanism configured to transmit torque output from the motor to the output shaft 652. The case 651 has a box shape. In the case 651, the motor and the transmission mechanism (not illustrated) are accommodated. A base-end-side part of the output shaft 652 in its axial direction is accommodated in the case 651, and a distal-end-side part of the output shaft 652 in the axial direction projects from the case 651. The case 651 is fixed to the third part 613 of the support plate 61 from the back-surface side of the support plate 61. At this time, the output shaft 652 extends through the insertion hole 615 of the third part 613. Thus, the rotation axis of the output shaft 652 extends in the plate-thickness direction of the support plate 61.

As illustrated in FIGS. 8, 9, the cover 66 has a shape similar to that of the third part 613 of the support plate 61 in a plan view of the door driving device 60. The cover 66 is fixed to the third part 613 of the support plate 61 by fastening members (not illustrated). That is, the cover 66 covers the third part 613 of the support plate 61 from the front-surface side. In the present embodiment, the cover 66, the support plate 61, and the bending plate 62 are fastened jointly by the fastening members. At this time, the support plate 61 is sandwiched between the cover 66 and the driving portion 65 in the plate-thickness direction.

As illustrated in FIGS. 8, 9, the drive pulley 67 is a toothed pulley. The drive pulley 67 is connected to the output shaft 652 extending through the insertion hole 615 of the support plate 61. Accordingly, in a case where the output shaft 652 rotates, the drive pulley 67 rotates together with the output shaft 652. The two pressing pulleys 68, 69 are rotatably supported by the third part 613 of the support plate 61. More specifically, first ends of rotation shafts of the two pressing pulleys 68, 69 are supported by the third part 613 of the support plate 61, and second ends of the rotation shafts of the two pressing pulleys 68, 69 are supported by the cover 66. Note that respective rotation axes of the drive pulley 67 and the two pressing pulleys 68, 69 extend in the plate-thickness direction of the support plate 61.

The driven pulley 71 is rotatably supported by a first end of the support plate 61 in its longitudinal direction, and the driven pulley 72 is rotatably supported by a second end of the support plate 61 in the longitudinal direction. More specifically, a first end of a rotation shaft of the driven pulley 71 is supported by the first part 611 of the support plate 61, and a second end of the rotation shaft of the driven pulley 71 is supported by the pulley support portion 73. Similarly, a first end of a rotation shaft of the driven pulley 72 is supported by the second part 612 of the support plate 61, and a second end of the rotation shaft of the driven pulley 72 is supported by the pulley support portion 74. Thus, respective rotation axes of the two driven pulleys 71, 72 extend in the plate-thickness direction of the support plate 61.

The belt 75 is a toothed belt made of elastomer such as rubber or resin. The belt 75 is wound around the drive pulley 67, the two pressing pulleys 68, 69, and the two driven pulleys 71, 72. The belt 75 is pressed against the drive pulley 67 by the two pressing pulleys 68, 69. Tension is applied to the belt 75 by the two driven pulleys 71, 72 and the guide portions 64 so that the belt 75 does not loosen. Thus, the belt 75 is driven when the drive pulley 67 rotates. In a case where the belt 75 is driven, the belt 75 slides on the guide portions 64 (i.e., the belt 75 makes sliding contact with the guide portions 64).

The connector 76 is a member by which the upper hinge units 52F, 52R of the slide door 50 are connected to the belt 75. In a case where the belt 75 is driven, power of the belt 75 is transmitted to the upper hinge units 52F, 52R via the connector 76.

Figure 10:
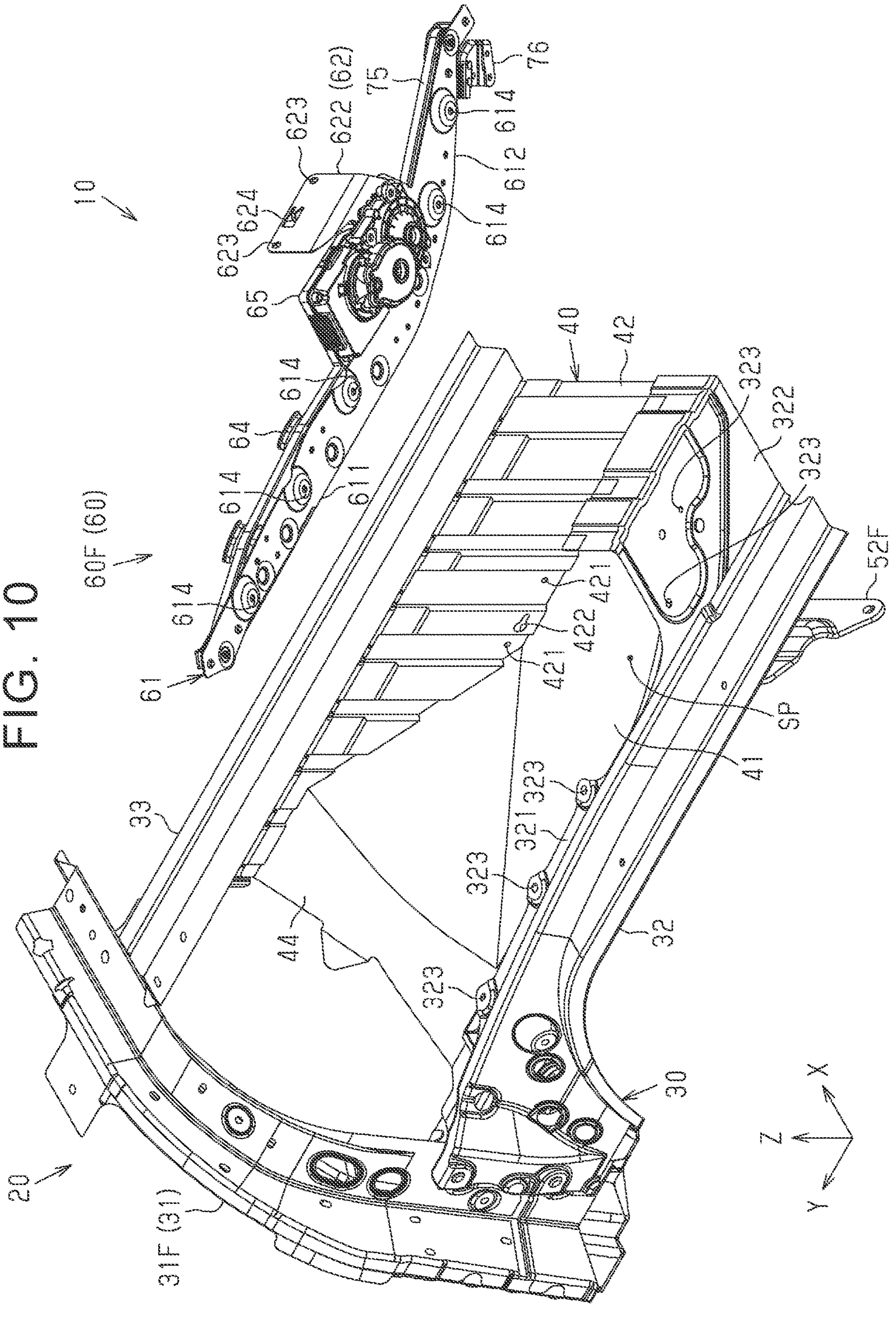
FIG. 10 is a perspective view for illustrating a state where the slide door driving device is installed in the vehicle body.

Next, the operation of the present embodiment will be described. More specifically, the following describes the operation at the time when the door driving device 60 is installed in the vehicle body 20. As illustrated in FIG. 10, at the time when the door driving device 60 is installed in the vehicle body 20, an operator inserts the door driving device 60 into the accommodation space SP of the vehicle body 20. At this time, the operator moves the door driving device 60 outwardly in the width direction and also moves the door driving device 60 rearwardly. Further, the operator inserts the door driving device 60 into the accommodation space SP with the second part 612 of the support plate 61 being set as a distal end in the insertion direction of the door driving device 60. Note that the operation for installing the door driving device 60 is performed in the vehicle cabin.

Thus, the support plate 61 of the door driving device 60 is placed on the second panel 321 and the third panel 322 of the second frame 32. More specifically, as illustrated in FIG. 3, the first part 611 of the support plate 61 is placed on the second panel 321 of the second frame 32, and the second part 612 of the support plate 61 is placed on the third panel 322 of the second frame 32.

Figure 11:
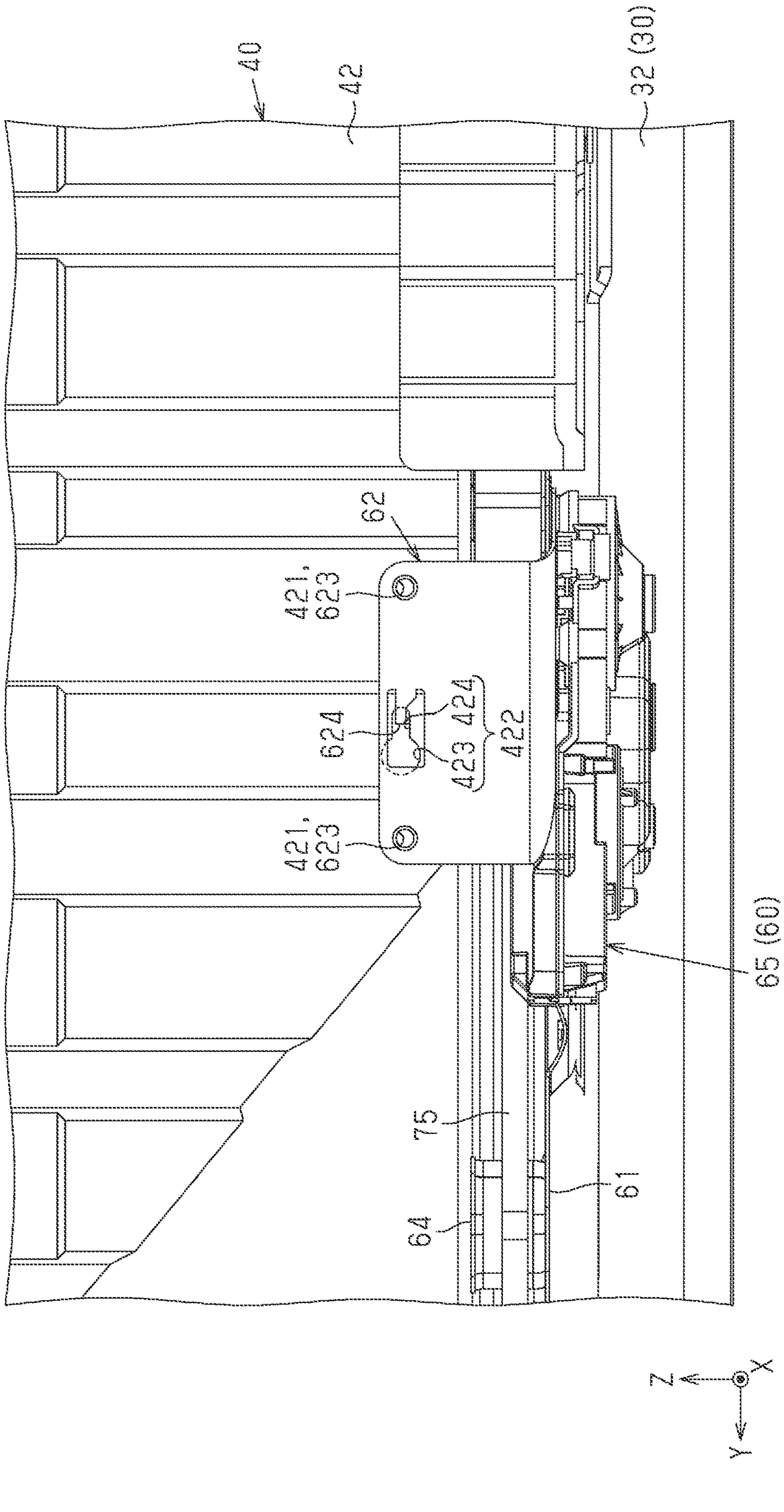
FIG. 11 is a side view for illustrating the state where the slide door driving device is installed in the vehicle body.

As illustrated in FIGS. 3, 10, 11, the locking portion 624 of the bending plate 62 of the door driving device 60 is engaged with the inner wall 42 of the reinforcing structure 40 in a locked manner. More specifically, the locking portion 624 of the bending plate 62 is inserted into the first locking hole 423 of the inner wall 42 and then the locking portion 624 is locked in (i.e., engaged with) the second locking hole 424 of the inner wall 42. Accordingly, even when the operator takes the hand off the door driving device 60, the door driving device 60 does not fall off from the accommodation space SP. At this time, in the door driving device 60, the second bending plate 622 is disposed inwardly in the width direction from the driving portion 65.

After that, as illustrated in FIG. 10, the operator fastens the second panel 321 and the third panel 322 of the second frame 32 to the support plate 61 of the door driving device 60 by fastening members via the fixing holes 323, 614. Further, the operator fastens the inner wall 42 of the reinforcing structure 40 to the bending plate 62 of the door driving device 60 by fastening members via the fixing holes 421, 623. Thus, the door driving device 60 is installed above the door opening 21.

Next, the effects of the present embodiment will be described. (1) The door driving device 60 is configured by attaching the driven pulleys 71, 72 and the driving portion 65 to the support plate 61 that is an elongated plate member. Accordingly, in the door driving device 60, it is possible to easily change the length of the support plate 61 and it is possible to easily change the positions of the driven pulleys 71, 72. Accordingly, the door driving device 60 can be easily applied to a plurality of vehicle types.

(2) Since the bending plate 62 has the fixing holes 623 extending through the bending plate 62 in the width direction, the fastening direction in which the bending plate 62 is fastened to the reinforcing structure 40 is the width direction. Accordingly, in comparison with a case where the fastening direction in which the bending plate 62 is fastened to the reinforcing structure 40 is the up-down direction, a target to which the bending plate 62 is fixed does not need to be disposed inwardly in the width direction. In other words, it is not necessary to further extend the bottom wall 41 of the reinforcing structure 40 inwardly in the width direction. Thus, the vehicle cabin is not likely to become narrow.

(3) When the operator installs the door driving device 60 in the vehicle body 20, the operator can lock the bending plate 62 in the locking hole 422 of the reinforcing structure 40. This allows the operator to put part of the self-weight of the door driving device 60 on the vehicle body 20. Thus, the door driving device 60 enhances ease of work (i.e., enhances work efficiency).

(4) The door driving device 60 includes the guide portions 64. This allows the door driving device 60 to stably drive the belt 75. The guide portion 64 includes the pressing wall 643. This allows the guide portions 64 to restrain the belt 75 from moving upward relative to the guide portions 64. In other words, in the door driving device 60, the belt 75 can be restrained from moving away from the guide portions 64.

(5) The door driving device 60 includes the reinforcing frame 63 configured to reinforce the support plate 61. Accordingly, the support plate 61 is not likely to deform (i.e., the support plate 61 hardly deforms) due to external force. Accordingly, at the time when the operator carries the door driving device 60, it is possible to reduce the possibility that the support plate 61 may deform.

(6) The bending plate 62 fixed to the vehicle body 20 is fixed to the third part 613 of the support plate 61, and the driving portion 65 configured to drive the belt 75 is fixed to the third part 613 of the support plate 61. In other words, the driving portion 65 is disposed in the vicinity of a fixation part of the door driving device 60 that is fixed to the vehicle body 20. Thus, in the door driving device 60, the posture of the driving portion 65 can be restrained from becoming unstable due to vibration or the like at the time when the vehicle 10 travels.

The present embodiment can also be carried out by making changes as stated below. The present embodiment and the following modifications can be carried out in combination as long as they do not cause any technical inconsistencies.—The support plate 61 may be formed with the use of a resin material, as long as the rigidity of the support plate 61 can be secured. Even in this case, the support plate 61 has a plate shape, and therefore, it is possible to achieve the effect (1) of the above embodiment.

The bending plate 62 may not include the locking portion 624. The bending plate 62 may include the locking hole 422 instead of the locking portion 624. In this case, the inner wall 42 of the reinforcing structure 40 may include the locking portion 624 instead of the locking hole 422.

In a state where the door driving device 60 is installed in the vehicle body 20, the second bending plate 622 may be inclined from the up-down direction. In this case, the axis of the fixing hole 623 of the second bending plate 622 is inclined from the width direction. Therefore, the fastening direction in which the second bending plate 622 is fastened to the inner wall 42 is also inclined from the width direction.

The door driving device 60 may include pulleys instead of the guide portions 64. The door driving device 60 may not include the reinforcing frame 63. In this case, in order to secure the rigidity of the support plate 61, the support plate 61 may have a recess and a projection or recesses and projections, or the plate thickness of the support plate 61 may be increased.

The opening-closing direction of the slide door 50 may not be the front-rear direction. For example, the opening-closing direction of the slide door 50 may be the width direction. The vehicle 10 may include only the slide door 50F on the front side or may include only the slide door 50R on the rear side.

What is claimed is:

1. A slide door driving device configured to drive a slide door, the slide door driving device installed above a door opening of a vehicle body, the slide door configured to open and close the door opening, the slide door driving device comprising:

a support plate that is an elongated plate member;

two driven pulleys supported respectively by opposite ends of the support plate in a longitudinal direction of the support plate;

a belt wound around the two driven pulleys;

a connector by which upper hinge units of the slide door are connected to the belt, movement of the belt is configured to be transmitted to the slide door by way of the connector and upper hinge units;

a driving portion supported by the support plate and configured to drive the belt; and a fixing plate extending from the support plate such that a plane formed by the fixing plate intersects with the support plate, the fixing plate being fixed to the vehicle body, wherein the fixing plate is fixed to the vehicle body, the fixing plate is disposed inwardly in a vehicle width direction with respect to the driving portion, wherein the fixing plate has a first fixing hole extending through the fixing plate in the vehicle width direction, wherein the support plate has a second fixing hole extending through a thickness direction of the support plate, the support plate being fixed to the vehicle body through the second fixing hole, wherein the second fixing hole extends through the support plate in a vehicle up-down direction in a state where the support plate is fixed to the vehicle body, and wherein the second fixing hole has a conical recessed structure in the up and down direction.

2. The slide door driving device according to claim 1, wherein the fixing plate is formed by bending a metal plate configured to be fastened to the support plate.

3. The slide door driving device according to claim 1, wherein the fixing plate includes a locking portion configured to be locked to the vehicle body.

4. The slide door driving device according to claim 3, wherein the locking portion is formed by cutting and raising a part of the fixing plate.

5. The slide door driving device according to claim 1, further comprising a guide portion supported by the support plate and configured to guide the belt by making sliding contact with the belt.

6. The slide door driving device according to claim 1, further comprising a reinforcing frame extending in the longitudinal direction of the support plate, the reinforcing frame being configured to reinforce the support plate.

7. The slide door driving device according to claim 1, wherein the support plate includes an inner portion extending inward in the vehicle width direction, the driving portion is fixed to the inner portion, and the fixing plate fixed to the vehicle body is fixed to the inner portion, and the fixing plate is disposed further inward in the vehicle width direction than the driving portion.

8. The slide door driving device according to claim 7, wherein the support plate includes a pair of side surfaces extending in a longitudinal direction, a part of the side surfaces that is disposed inwardly in the vehicle width direction projects inwardly in the vehicle width direction and forms the inner portion.

9. A slide door driving device configured to drive a slide door, the slide door driving device installed above a door opening of a vehicle body, the slide door configured to open and close the door opening, the slide door driving device comprising:

a support plate that is an elongated plate member;

two driven pulleys supported respectively by opposite ends of the support plate in a longitudinal direction of the support plate;

a belt wound around the two driven pulleys;

a connector by which upper hinge units of the slide door are connected to the belt, movement of the belt is configured to be transmitted to the slide door by way of the connector and upper hinge units;

a driving portion supported by the support plate and configured to drive the belt; and a fixing plate extending from the support plate such that a plane formed by the fixing plate intersects with the support plate, the fixing plate being fixed to the vehicle body, wherein the fixing plate is fixed to the vehicle body, the fixing plate is disposed inwardly in a vehicle width direction with respect to the driving portion, wherein the fixing plate has a first fixing hole extending through the fixing plate in the vehicle width direction, wherein the support plate has a second fixing hole extending through a thickness direction of the support plate, the support plate being fixed to the vehicle body through the second fixing hole, wherein the second fixing hole extends through the support plate in a vehicle up-down direction in a state where the support plate is fixed to the vehicle body, and wherein an output shaft of the driving portion is inserted into an insertion hole of the support plate.

10. The slide door driving device according to claim 9, wherein the output shaft of the driving portion is inserted into the insertion hole located on an inner portion of the support plate.

11. The slide door driving device according to claim 10, wherein the output shaft is connected to a drive pulley.

* * * * *